A. BARR AND W. STROUD.
MEANS FOR MEASURING HEIGHTS OR HORIZONTAL DISTANCES.
APPLICATION FILED JUNE 5, 1918.
1,322,751.
Patented Nov. 25, 1919.
5 SHEETS—SHEET 3.
FIG: 4.
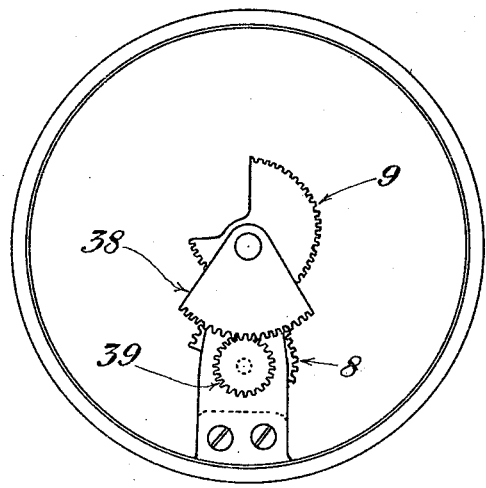
FIG: 5.
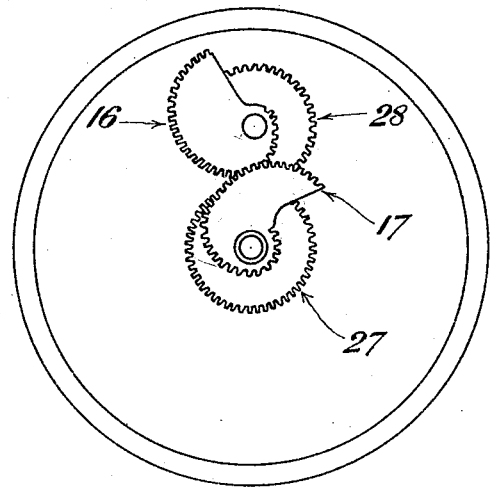
FIG: 6.
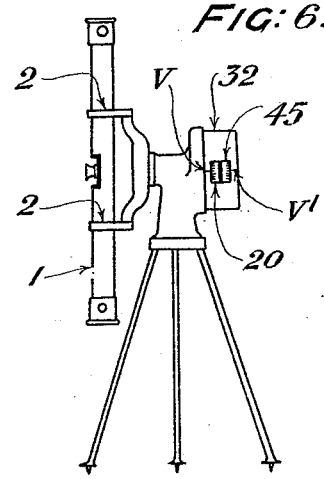
FIG: 7.
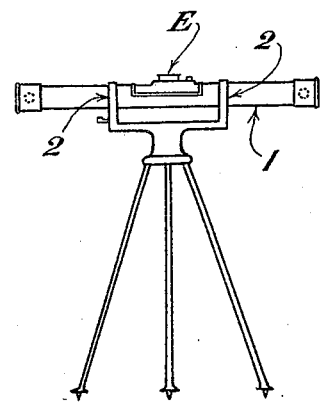
Inventors.
Archibald Barr.
William Stroud
By T. Walter Fowler
Atty.

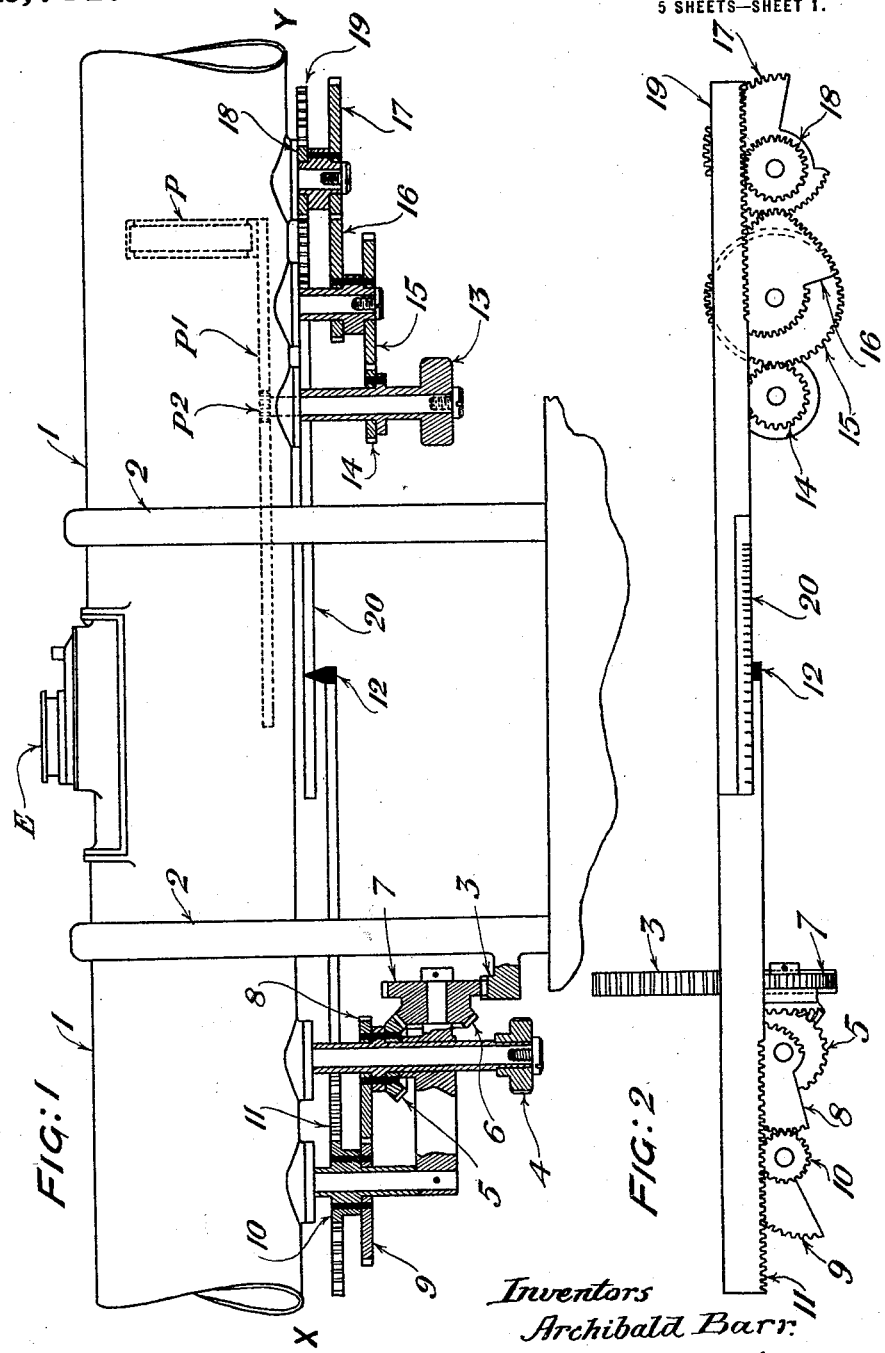

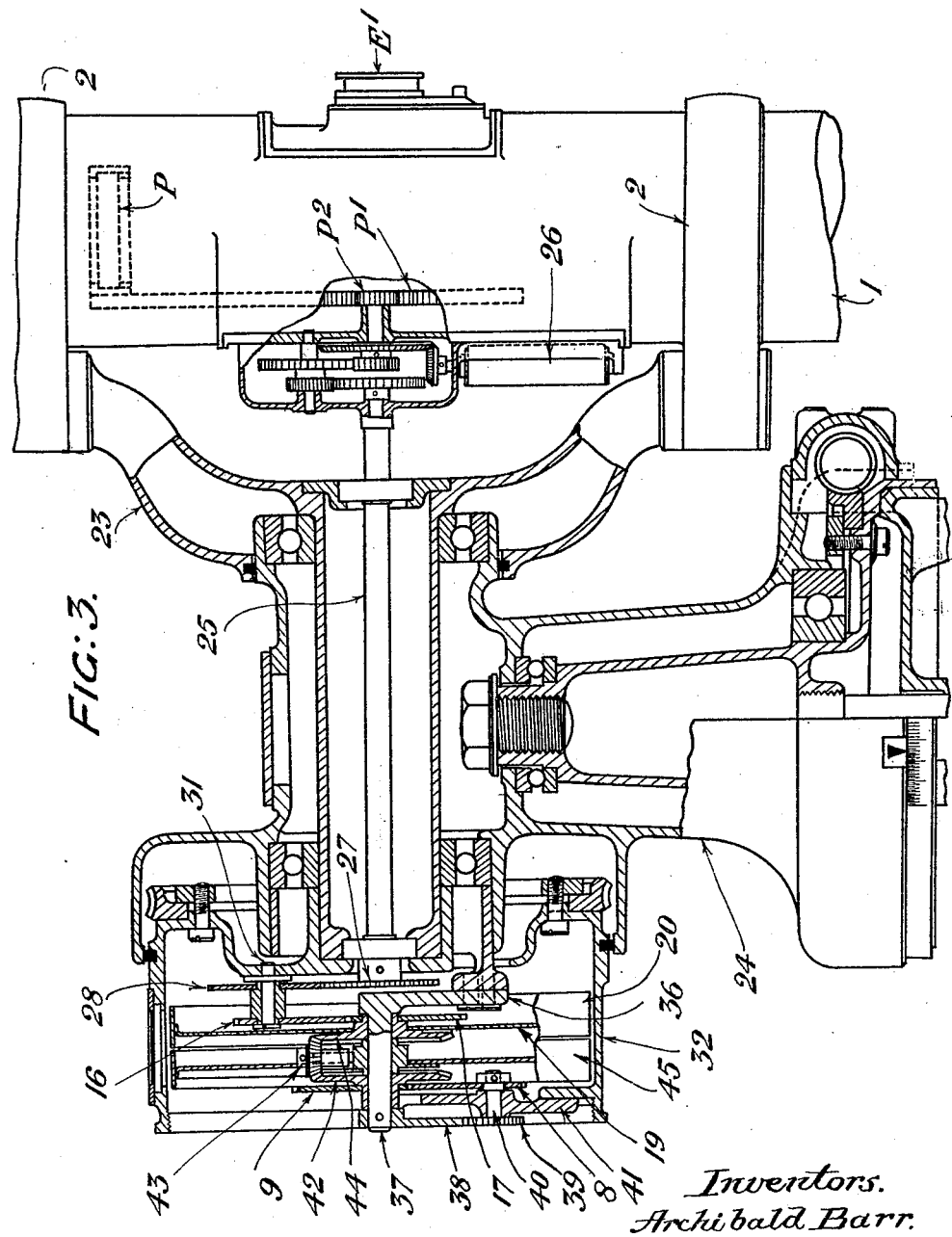

A. BARR AND W. STROUD.
MEANS FOR MEASURING HEIGHTS OR HORIZONTAL DISTANCES.
APPLICATION FILED JUNE 5, 1918.
1,322,751.
Patented Nov. 25, 1919.
5 SHEETS—SHEET 4.
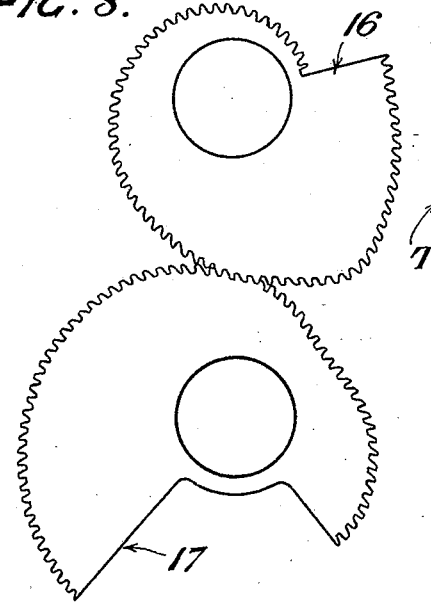
FIG: 8.
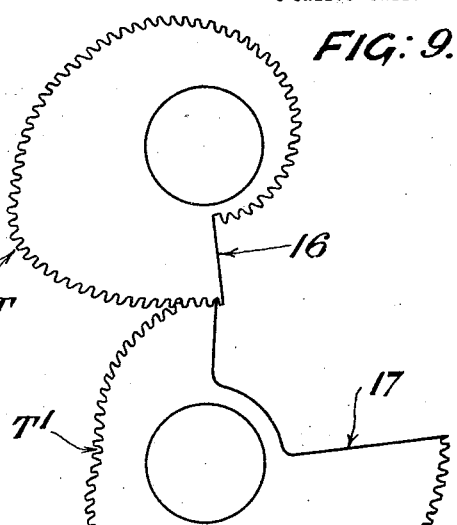
FIG: 9.
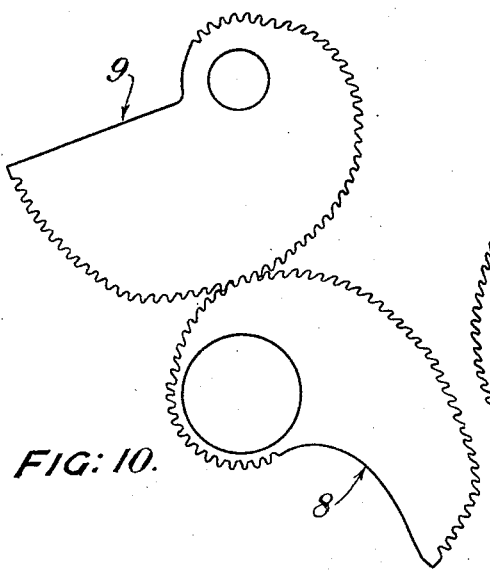
FIG: 10.
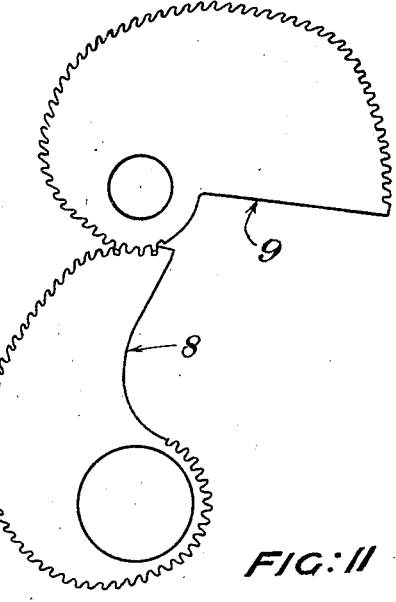
FIG: 11.
Inventors.
Archibald Barr.
William Stroud.
By T. Walter Fowler.
Atty.

A. BARR AND W. STROUD.
MEANS FOR MEASURING HEIGHTS OR HORIZONTAL DISTANCES.
APPLICATION FILED JUNE 5, 1918.
1,322,751.
Patented Nov. 25, 1919.
5 SHEETS—SHEET 5.
FIG: 13.
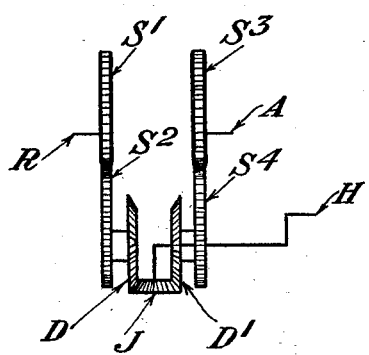
FIG: 12.
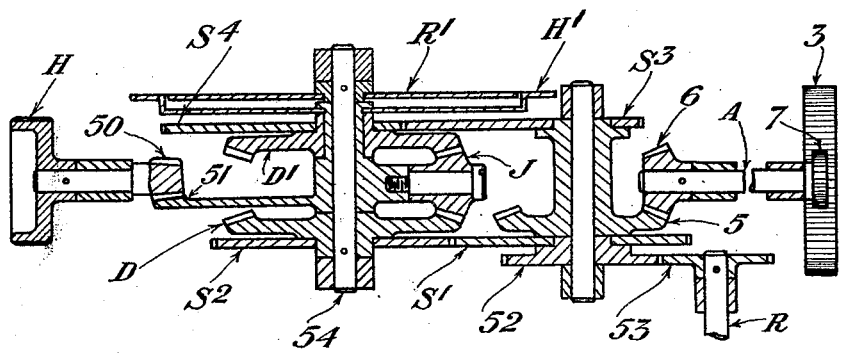
Inventors.
Archibald Barr.
William Stroud.
By J. Walter Fowler
Atty.

UNITED STATES PATENT OFFICE.

ARCHIBALD BARR AND WILLIAM STROUD, OF ANNIESLAND, GLASGOW, SCOTLAND.

MEANS FOR MEASURING HEIGHTS OR HORIZONTAL DISTANCES.

1,322,751.   Specification of Letters Patent.   Patented Nov. 25, 1919.

Application filed June 5, 1918. Serial No. 238,337.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in or Connected with Means for Measuring Heights or Horizontal Distances, of which the following is a specification.

In measuring heights or horizontal distances use is made of the knowledge that $H = R \sin \alpha$ (where H is the height, R the range and $\alpha$ the angle of sight) and that by adding together log R and log sin $\alpha$ or log cosine $\alpha$ the height or horizontal distance upon a logarithmic scale of heights or horizontal distances may be obtained.

This invention relates to improvements in or connected with means whereby motions according to a rangefinder scale automatically converted into motions corresponding to the logarithm of the range, and motions according to angle of sight automatically converted into motions according to the logarithm of the sine or cosine of the angle of sight are combined in order to give a motion corresponding with the logarithm of the height or horizontal distance of the target.

According to this invention one or both of the conversions required is effected by means of toothed gear converting mechanism which in one form comprises toothed spiral gears.

Confining attention to the measurement of heights, some examples of means according to this invention will now be described with reference to the accompanying drawings, in which:—

Figure 1 shows an elevation of a height attachment according to the present invention for the case of a range-finder where the base is horizontal, and Fig. 2 is a plan of the gear taken along the line X Y of Fig. 1.

Fig. 3 shows an elevation of a second arrangement for the case of a rangefinder whose base is vertical when the target is on the horizon, and Figs. 4 and 5 are corresponding face views of the gear.

Figs. 6 and 7 are diagrams on a small scale of rangefinders mounted upon tripods, Fig. 6 corresponding to the case of Fig. 3, but reversed right for left, and Fig. 7 corresponding to the case of Figs. 1 and 2, but in Fig. 7 the gear is not indicated.

Figs. 8 and 9 show the nature of the spiral gear for converting from the reciprocal scale of the rangefinder into a logarithmic scale of ranges, while Figs. 10 and 11 show the corresponding gear for converting angles of altitude into logarithmic sines of such angles.

Fig. 12 is a sectional view of apparatus according to a modification, and Fig. 13 is a diagram illustrating the principle of action upon which the construction of Fig. 12 is based.

In Figs. 1 and 2, see also diagram Fig. 7, a self-contained base rangefinder 1 is supported horizontally in forks 2 2, to one of which there is attached a stationary rack 3, in the form of an arc of a circle whose center coincides with the axis of rotation of the rangefinder. 4 is a working head, fixed to a sleeve for elevating the instrument. E is the eyepiece of the instrument. The position of the instrument as shown in Figs. 1 and 7 is with the eyepiece E at the top of the instrument, so that an observer is looking down vertically in viewing objects on the horizon. In this case the axis of the eyepiece alters with changes in the angle of sight. A bevel 5 is fixed to the same sleeve as 4 so that on rotating 4, bevel 5 rotates a bevel 6 to which a spur wheel 7 is fixed. The wheel 7 gears with the rack 3 so that 7 climbs up or down the fixed rack 3 when the head 4 is turned. Fixed to bevel 5 is a toothed spiral gear 8 gearing with a toothed spiral gear 9 fixed to a spur wheel 10 gearing with a rack 11 carrying a pointer 12. The gears 8 and 9 are so designed that when a rotation proportional to the angle of sight is imparted to 8 the rotation of 9 shall be proportional to log sin $\alpha$ between certain assigned limits, say from 10° to 70° of angle of sight; thus the motion of pointer 12 is proportional to log sin $\alpha$ between 10° and 70°.

Figs. 10 and 11 show the gears 8 and 9 drawn more accurately to scale in two positions. Fig. 11 shows the position when the angle of sight is below 10°, *i. e.*, beyond the point of conversion from $\alpha$ to log sin $\alpha$, while Fig. 10 corresponds to an angle of sight of about 48°, where the conversion is effected. The curious termination of the gears in mesh, as shown in Fig. 11, is due to the fact that it is impossible to effect the conversion much below 10°, as the radii of the teeth upon 9 would become very small indeed. But while the conversion stops at 10° it is desirable that the rangefinder should not be limited in this way. Teeth are therefore inserted below the position corresponding to 10° merely with the object of keeping 8 9 in mesh when the rangefinder is looking horizontally.

The working head for operating the range measuring device of the rangefinder, for instance, whereby coincidence is effected, is indicated by 13. As an example of a range measuring device we may take the case of a traveling refracting prism P fixed to a rack P¹ and actuated by a pinion P² fixed to and rotated by 13. There is also fixed to 13 a spur wheel 14 gearing with a spur wheel 15 fixed to a toothed spiral gear 16 gearing with a toothed spiral gear 17 which is fixed to a spur wheel 18 gearing with a rack 19.

Figs. 8 and 9 show the gears 16 and 17 drawn more accurately to scale in two positions. Fig. 9 shows the position corresponding to or near infinity, i. e., beyond the region of conversion from $\frac{1}{R}$ to log R. The teeth in these gears are calculated to effect the conversion from 2000 yards to 12500 yards. The position corresponding to 12500 yards is shown by the marked tooth T upon 16, and by the marked gap T¹ upon 17. The teeth between T and T¹ are intended merely to keep the gear in mesh when it is desired to test the adjustment of the rangefinder for infinity.

The rack 19, see Figs. 1 and 2, carries at its distant end a logarithmic scale of heights 20. Thus, as the working head 13 is operated in accordance with changes in range, the scale 20 is moved to and fro, while, as the working head 4 is operated in accordance with changes of angle of sight, the pointer 12 is moved to and fro upon scale 20, so that its position relatively to this scale gives the required height.

Fig. 3, see also Figs. 4 and 5 and diagram Fig. 6, shows an elevation for the case in which a rangefinder 1 supported in forks 2 2 is movable in a vertical plane about a horizontal axis, while Figs. 4 and 5, show face views of the gear. In this case the optical axis of the eyepiece E¹ is horizontal and remains horizontal for all angles of sight. In Fig. 3 some of the central parts and parts 23 and 40 revolve with the rangefinder with variations of the angle of sight, and parts 24, 36 and 38 remain stationary, in the same sense as 24, which is a stand upon which the rangefinder and associated gear are mounted. The stand 24 is mounted capable of azimuthal adjustment by rotation about its vertical axis. The working head 26 of the rangefinder is geared with a pinion P² which operates the range measuring mechanism of the instrument represented as in Fig. 1 as consisting of traveling refracting prism P carried by a rack P¹ with which the pinion P² gears. The working head 26 is also geared with a shaft 25 which operates the log range gear, the shaft 25 being provided with a pinion 27, gearing with a wheel 28 which drives toothed spiral gear 16. The wheel 28 and spiral gear 16 are fixed to a sleeve mounted to rotate about a shaft 31 which revolves with the rangefinder with variations of angle of sight. Toothed spiral gear 16 gears with toothed spiral gear 17 to which is fixed disk 19 carrying a logarithmic scale of ranges 20 moving opposite a pointer V, see Fig. 6, provided on the case 32. Thus, as the working head 26 is moved, scale 20 is also moved with reference to the pointer V so that the range may be read off upon scale 20.

In the next place, we shall consider the means whereby the motion of the rangefinder according to angle of sight effects the conversion from $\alpha$ to log sin $\alpha$. The shaft 37 is fixed to the stand 24 by means of an arm 36 forking into lugs fixed to the stand. Fixed to shaft 37 is a toothed sector 38 which therefore remains stationary as the instrument is moved in accordance with angle of sight. An arm 41 is fixed to rotate with the rangefinder case 1. This arm carries a shaft 40 supporting a pinion 39 gearing with 38. Thus as the rangefinder is turned about the horizontal axis the pinion 39 is rotated through an angle proportional to the changes of the angle of sight. Toothed spiral gear 8 and pinion 39 are fixed to rotate with shaft 40 so that 8 is rotated by changes of angle of sight. Toothed spiral 8 gears with toothed spiral 9 to which is fixed bevel wheel 42 gearing with jockey 43 of the differential gear 42, 43, 44, the latter bevel 44 being fixed to disk 19. Thus as the angle of sight is varied bevel 42 is rotated according to the value of log sin $\alpha$, while as the range is altered 20 is moved according to log R consequently the jockey 43 to which is attached a logarithmic scale of heights 45 may be arranged to move according to log R+log sin $\alpha$ i. e., according to log H. The height may then be read off by means of a pointer V¹ fixed to case 32.

In the apparatus described with reference to Figs. 1, 2, 3, 4, 5, 6 and 7 the operation of the working head adjusts the range measuring device of the rangefinder by direct actuation. An example of apparatus according to this invention will now be described with reference to Figs. 12 and 13, wherein a working head is provided the operation of which directly actuates the height indicating element so that a definite position of the working head in this case corresponds to a definite height. Thus, in this case for a definite position of the working head, and therefore for a definite height, the range measuring gear is operated by the motion of the rangefinder corresponding to varying angles of sight in such a way that an aircraft flying at that definite and constant height would have its two images always in coincidence notwithstanding its changes in range and changes of angle of sight.

It will thus be seen that the position of the range measuring device depends on two factors (1) the position of the working head, and (2) the angle of sight.

In Fig. 13, R represents, say, a shaft communicating with the range measuring device of the rangefinder, A a shaft which is rotated by the motion of the rangefinder in accordance with angle of sight. $S^1$ and $S^2$ are toothed spiral gears which convert, say, from a reciprocal scale for shaft R into a logarithmic scale of ranges for the shaft upon which $S^2$ is mounted. $S^3$ and $S^4$ are toothed spiral gears which convert from a uniform scale of angles of sight associated with the shaft A into a logarithmic sine scale for the shaft upon which $S^4$ is mounted. D, $D^1$ and J form an ordinary differential gear, so that as the motions of D correspond to changes in the value of the logarithms of range and the motions of $D^1$ correspond to changes in the value of the logarithms of the sine of the angle of sight the motions of the jockey J can be arranged to indicate the values of the height upon a logarithmic scale. In the constructions described with reference to Figs. 1, 2 and 3, 4, 5, the working heads were associated with two shafts corresponding to A and R, i. e., shaft A was rotated when producing variation in the angle of sight and shaft R was rotated to suit variations in range. In the present case however, the working heads are associated with A for angle of sight (as before) and with H for height, H controlling the position of jockey J—i. e., the spindle of J is rigidly fixed to H, see Fig. 13.

Fig. 12 is a section showing how the various parts mentioned may be embodied in a piece of apparatus which may form an attachment to an ordinary rangefinder. 3 is a fixed rack in the shape of an arc of a circle attached to the stand (not shown) so that as the rangefinder is rotated in its bearings for variations in the angle of sight, toothed wheel 7 rolls upon 3 and imparts motion to shaft A in accordance with changes of angle of sight, which by means of bevel wheels 6 and 5 communicates motion to spiral $S^3$ in gear with spiral $S^4$ fixed to the bevel $D^1$, of the differential gear. In a similar fashion head H (controlling the height scale) by means of bevel wheels 50 and 51 controls the position of jockey J so that the position of bevel wheel D depends partly on the position of $D^1$ and partly on the position of J. Now the position of $D^1$ depends upon the angle of sight and the position of J depends on the height reading so that the range depends upon the position of D. D is fixed to spiral $S^2$ gearing with spiral $S^1$ to which is fixed a toothed wheel 52 gearing with 53 fixed to shaft R communicating with the range measuring device of the rangefinder. A dial $H^1$ fixed to jockey J may be used in association with a fixed pointer (not shown) for indicating the height while a dial $R^1$ (also associated with a fixed pointer which is not shown) fixed to shaft 54 to which the parts D and $S^2$ are also fixed may be used for indicating the range.

Rangefinders are most generally provided with scales of the reciprocal character, but it is to be understood that this invention is not only applicable to rangefinders of that type but also to those having scales of uniform or other character.

We claim:

1. Means for measuring heights (or horizontal distances) consisting of toothed gear scale converting mechanism for automatically converting motions according to a rangefinder scale into motions corresponding to the logarithm of the range, and mechanism for automatically converting motions according to angle of sight into motions according to the logarithm of the sine (or cosine) of the angle of sight, in combination with mechanism whereby the motions resulting from the two conversions are combined, for the purposes set forth.

2. Means for measuring heights (or horizontal distances) consisting of scale converting mechanism for automatically converting motions according to a rangefinder scale into motions corresponding to the logarithm of the range, and toothed gear mechanism for automatically converting motions according to angle of sight into motions according to the logarithm of the sine (or cosine) of the angle of sight, in combination with mechanism whereby the motions resulting from the two conversions are combined, for the purposes set forth.

3. Means for measuring heights (or horizonal distances) consisting of toothed gear scale converting mechanism for automatically converting motions according to a rangefinder scale into motions corresponding to the logarithm of the range, and toothed gear mechanism for automatically converting motions according to angle of sight into motions according to the logarithm of the sine (or cosine) of the angle of sight, in combination with mechanism whereby the motions resulting from the two conversions are combined, for the purposes set forth.

4. Means for measuring heights (or horizontal distances) consisting of toothed gear scale converting mechanism for automatically converting motions according to a rangefinder scale into motions corresponding to the logarithm of the range, and toothed spiral gear mechanism for automatically converting motions according to angle of sight into motions according to the logarithm of the sine (or cosine) of the angle of sight, in combination with mechanism whereby the motions resulting from the two conversions are combined, for the purposes set forth.

5. Means for measuring heights (or horizontal distances) consisting of toothed spiral gear scale converting mechanism for automatically converting motions according to a rangefinder scale into motions corresponding to the logarithm of the range, and toothed gear mechanism for automatically converting motions according to angle of sight into motions according to the logarithm of the sine (or cosine) of the angle of sight, in combination with mechanism whereby the motions resulting from the two conversions are combined, for the purposes set forth.

6. Means for measuring heights (or horizontal distances) consisting of toothed spiral gear scale converting mechanism for automatically converting motions according to a rangefinder scale into motions corresponding to the logarithm of the range, and toothed spiral gear mechanism for automatically converting motions according to angle of sight into motions according to the logarithm of the sine (or cosine) of the angle of sight, in combination with mechanism whereby the motions resulting from the two conversions are combined, for the purposes set forth.

7. Means for measuring heights (or horizontal distances) consisting of toothed gear scale converting mechanism for automatically converting motions according to a rangefinder scale into motions corresponding to the logarithm of the range, and mechanism for automatically converting motions according to angle of sight into motions according to the logarithm of the sine (or cosine) of the angle of sight, in combination with a differential gear, one element of which is arranged to be moved automatically proportionately to the conversion effected corresponding to the logarithm of the range, while a second is arranged to be moved automatically proportionately to the conversion effected according to the logarithm of the sine (or cosine) of the angle of sight so that the third element of the differential gear is caused to move proportionately to the logarithm of the height (or the logarithm of the horizontal distance), for the purpose set forth.

8. Means for measuring heights (or horizontal distances) consisting of toothed gear scale converting mechanism for automatically converting motions according to a rangefinder scale into motions corresponding to the logarithm of the range, and toothed gear mechanism for automatically converting motions according to angle of sight into motions according to the logarithm of the sine (or cosine) of the angle of sight, in combination with a differential gear for combining the two conversions, to one of the elements of which is applied motions in accordance with variations of log sine $\alpha$ and to another of which is applied motions in accordance with variations of log H, for the purposes set forth.

9. Means for measuring heights (or horizontal distances) consisting of toothed spiral gear scale converting mechanism for automatically converting motions according to a rangefinder scale into motions corresponding to the logarithm of the range, and toothed spiral gear mechanism for automatically converting motions according to angle of sight into motions according to the logarithm of the sine (or cosine) of the angle of sight, in combination with a differential gear for combining the two conversions, to one of the elements of which is applied motions in accordance with variations of log sine $\alpha$ and to another of which is applied motions in accordance with variations of log H, for the purposes set forth.

10. Mechanism consisting of a differential gear, a working head in direct gear with a first element of the differential, toothed spiral gear converting mechanism in gear with a second element of the differential and in gear with a rangefinder adapted to be rotated about an axis in accordance with angle of sight, and toothed spiral gear, converting mechanism in gear with the third element of the differential and in gear with the range measuring device of the rangefinder, for the purposes set forth.

ARCHIBALD BARR.
WILLIAM STROUD.

Witnesses:
OSWIN EDWIN HOWARD BIRCHALL,
WILLIAM GENDRICH.